2,773,077
PREPARATION OF STEROID 21-ALDEHYDES

John P. Conbere, Fanwood, N. J., assignor to Merck & Co., Inc., Rahway, N. J., a corporation of New Jersey No Drawing. Application June 16, 1953, Serial No. 362,135

6 Claims. (Cl. 260—397.45)

This invention relates to steroid aldehydes. More particularly, it is concerned with steroids having a glyoxyl side chain at the 17 position and processes for producing such compounds.

The 17-glyoxyl steroids are useful intermediates in the preparation of other valuable steroid compounds. Furthermore 17-glyoxyl steroids such as $\Delta^4$ - 3,11,20 - triketo - 17$\alpha$ - hydroxypregnene - 21 - aldehyde (cortisone - 21 - aldehyde) and $\Delta^4$ - 3,20 - diketo - 11$\beta$,17$\alpha$ - dihydroxypregnene - 21 - aldehyde (hydrocortisone - 21 - aldehyde) have valuable cortisone-like properties.

Prior to this invention the 17-glyoxyl steroids produced heretofore were ordinarily prepared from the corresponding 20-keto-21-hydroxy steroids by converting a 21-pyridinium salt of a 20-keto-21 hydroxy steroid to a 21-nitrone and hydrolyzing the nitrone with acid to produce the 21-aldehyde. However, this process is not completely satisfactory since it is long, requiring three separate reactions, and results in poor yields of the 17-glyoxyl steroids.

Therefore, one object of this invention is to provide a novel one-step process for producing 17-glyoxyl steroids from 20-keto-21-hydroxy steroids. A further object is to provide novel 17-glyoxyl steroids and aldehyde addition products thereof. Other objects will be apparent from the detailed description hereinafter provided.

According to the present invention it has been found that 17-glyoxyl steroids can be produced by a direct, one step process which comprises reacting the corresponding 20-keto-21-hydroxy steroid with cupric acetate. This process may be conveniently illustrated as follows:

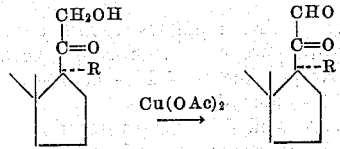

wherein R is a hydrogen acyloxy or hydroxy radical.

The production of the 17-glyoxyl steroids is preferably effected by reacting about two equivalents of cupric acetate with one equivalent of a 20-keto-21-hydroxy steroid. The use of a slight excess of cupric acetate, such as 2.1 to 2.2 equivalents thereof, serves to produce the best yields of the aldehydes.

The reaction is most conveniently achieved by intimately contacting the 20 - keto - 21 - hydroxy steroid and 20 - diketo - 11$\beta$ - hydroxypregnene - 21 - aldehyde, $\Delta^4$ - 3,20 - diketopregnene - 21 - aldehyde, 3,20 - diketopregnane - 21 - aldehyde and $\Delta^4$ - 3,20 - diketo - 17$\alpha$ - hydroxypregnene - 21 - aldehyde.

The novel 17-glyoxyl steroids of this invention may be converted to useful aldehyde addition products, such as cyanohydrins, hemiacetals, hemimercaptals, acetals, and mercaptals according to conventional methods. Thus, bisulfite addition products may be conveniently produced by reacting a 17-glyoxyl steroid with an aqueous solution of a suitable alkali metal or alkaline earth metal bisulfite. In addition, hemiacetals and acetals are readily produced by reacting a 17-glyoxyl steroid with a suitable alcohol such as methanol, ethanol, or propanol. When a mercaptan is used in place of an alcohol, the corresponding hemimercaptal or mercaptal may be readily produced. Furthermore, by reacting an aliphatic acid anhydride with a 17-glyoxyl steroid, there is produced the corresponding 21,21-diacylate. Thus, by reacting $\Delta^4$ - 3,11,20 - triketo - pregnene - 21 - aldehyde with an excess of acetic anhydride, there is produced the corresponding $\Delta^4$-21,21-diacetoxy,3,11,20-triketo-pregnene.

The following examples disclose specific applications of this invention and are included to illustrate but not limit the invention.

EXAMPLE 1

*Production of $\Delta^4$ - 3,11,20 - triketo - 17$\alpha$ - hydroxypregnene - 21 - aldehyde*

A hot solution of 6.0 gm. of cupric acetate hydrate in 200 ml. of methanol containing 1 ml. of glacial acetic cupric acetate in a suitable solvent such as water or a polar organic solvent. Examples of suitable polar organic solvents for this purpose are the lower alcohols, acetone, dioxane, tetrahydrofuran, and dimethoxyethane. Generally, it is found that maximum yields of the desired 17-glyoxyl steroid are obtained under optimum conditions by effecting the reaction at an acid pH. This is accomplished by adding a minor amount of an acid such as acetic acid to the reaction mixture.

The reaction proceeds slowly at normal temperatures but may be more quickly accomplished at elevated temperatures, preferably reflux temperature of the solvent mixture. At the reflux temperature the reaction is usually complete within an hour. After the reaction has been completed, the 17-glyoxyl steroid may be readily separated from the reaction mixture by conventional methods. One such typical separation method comprises filtering the reaction mixture to remove cuprous oxide and adding water to the filtrate to precipitate the product. The 17-glyoxyl steroids are ordinarily recovered as hydrates but yield the free aldehydes after drying under suitable conditions.

The 20-keto-21-hydroxy steroids which are convertible by this process to the corresponding 21-aldehydes may be saturated or unsaturated and substituted or unsubstituted. Thus, the steroid nucleus may be unsaturated such as at the 4:5, 7:8, 9:11, and 11:12 positions. In addition, nuclear substituents may be present in the steroid structure such as keto groups at the 3 and 11 positions, hydroxy groups at the 3, 11 and 17 positions, and halogen substituents at the 2, 4, 6, and 12 positions. Representative of such 20-keto-21-hydroxy steroids which may be converted to the corresponding 21-aldehydes and hydrates thereof by this invention are $\Delta^4$ - 3,11,20 - triketo - 17$\alpha$,21 - dihydroxypregnene (cortisone), $\Delta^4$ - 3,20 - diketo - 11$\beta$,17$\alpha$,21 - trihydroxypregnene (hydrocortisone), 3,11,20 - triketo - 17$\alpha$,21 - dihydroxypregnane (dihydrocortisone), 3,20 - diketo - 11$\beta$,17$\alpha$,21 - trihydroxypregnane (dihydrohydrocortisone), 3,11,20 - triketo - 17$\alpha$,21 - dihydroxyallopregnane (allodihydrocortisone), 3,20 - diketo - 11$\beta$,17$\alpha$,21 - trihydroxyallopregnane (allodihydrohydrocortisone), $\Delta^4$ - 3,11,20 - triketo - 21 - hydroxypregnene (11 - dehydrocorticosterone), $\Delta^4$ - 3,20 - diketo - 11$\beta$,21 - dihydroxypregnene (corticosterone), $\Delta^4$ - 3,20 - diketo - 21 - hydroxypregnene (desoxycorticosterone), 3,20 - diketo - 21 - hydroxypregnene (dihydrodesoxycorticosterone) and $\Delta^4$ - 3,20 - diketo - 17$\alpha$,21 - dihydroxypregnene (17 - hydroxydesoxycorticosterone).

Examples of some 17-glyoxyl steroids which can be produced from the corresponding 20-keto-21-hydroxy steroids by the application of this invention are $\Delta^4$-3,11,-20 - triketo - 17$\alpha$ - hydroxypregnene - 21 - aldehyde, $\Delta^4$ - 3,20 - diketo - 11$\beta$,17$\alpha$ - dihydroxypregnene - 21- aldehyde, 3,11,20 - triketo - 17α - hydroxypregnane - 21-aldehyde, 3,20 - diketo - 11β - 17α - dihydroxypregnane-21 - aldehyde, 3,11,20 - triketo - 17α - hydroxy-allopregnane - 21 - aldehyde, 3,20 - diketo - 11β - 17α - dihydroxyallopregnane - 21 - aldehyde, Δ⁴ - 3,11,20 - triketopregnene - 21 - aldehyde, Δ⁴ - 3, acid was added to a hot solution of 5.0 gm. of Δ⁴ - 3,11,20 - triketo - 17α,21-dihydroxypregnene in 200 ml. of methanol. The mixture was then refluxed for 30 minutes during which time cuprous oxide precipitated. About 75 ml. of water was added to the mixture and refluxing continued for 20 minutes. The mixture was filtered, 25 ml. of water was added to the filtrate, and the mixture concentrated under reduced pressure to about 75 ml. Then 50 ml. of water was added, and the solution was concentrated to 75 ml. Δ⁴ - 3,11,20 - triketo - 17α - hydroxypregnene - 21 - aldehyde crystallized from solution as a monohydrate. After cooling the reaction mixture in an ice bath, the product was collected and washed with water. The product gave an aldehyde test with Fuchsin aldehyde reagent and formed a quinoxaline with O-phenylenediamine. By reacting the product in methanolic solution with an equivalent amount of an aqueous solution of sodium bisulfite, the corresponding sodium bisulfite addition product of Δ⁴ - 3,11,20 - triketo - 17α - hydroxypregnene - 21 - aldehyde was prepared.

EXAMPLE 2

*Production of Δ⁴ - 3,20 - diketo - 11β,17α - dihydroxypregnene - 21 - aldehyde*

A hot solution of 6.0 gm. of cupric acetate hydrate in 200 ml. of methanol containing 1 ml. of glacial acetic acid was added to a hot solution of 5.0 gm. of Δ⁴-3,20-diketo - 11β,17α,21 - trihydroxypregnene in 200 ml. of methanol. The reaction mixture was refluxed for 30 minutes, 75 ml. of water was added, and refluxing continued for one hour during which time cuprous oxide precipitated. The reaction mixture containing Δ⁴-3,20-diketo - 11β,17α - dihydroxypregnene - 21 - aldehyde was filtered and the filtrate concentrated under reduced pressure to an oil. The yellow oil was dissolved in hot acetone and water was added until a cloud formed. The solution was clarified with charcoal and the acetone removed under reduced pressure. Δ⁴ - 3,20 - diketo - 11β,-17α - dihydroxypregnene - 21 - aldehyde precipitated from solution as a monohydrate and was collected by filtration. It gave an aldehyde reaction with Fuchsin aldehyde reagent.

EXAMPLE 3

*Production of Δ⁴-3,11,20-triketopregnene-21-aldehyde*

To a solution of 200 mg. of Δ⁴-3,11,20-triketo-21-hydroxypregnene in 10 ml. of methanol containing 3 drops of glacial acetic acid was added a solution of 240 mg. of cupric acetate hydrate in 30 ml. of methanol. The mixture was refluxed for 45 minutes and then filtered to remove the cuprous oxide which formed. About 40 ml. of water was added to the methanolic solution of Δ⁴ - 3,11,20 - triketopregnene - 21 - aldehyde and the mixture concentrated under reduced pressure to about 10 ml. The product crystallized from solution as a monohydrate and was recovered by filtration and dried.

EXAMPLE 4

*Production of 3,11,20 - triketo - 17α - hydroxypregnane - 21 - aldehyde*

A solution of 500 mg. of 3,11,20-triketo-17α,21-dihydroxypregnane in 20 ml. of methanol containing 5 drops of glacial acetic acid was combined with a solution of 540 mg. of cupric acetate hydrate in 50 ml. of methanol. The mixture was refluxed for 45 minutes and filtered to remove the cuprous oxide which formed. The filtrate containing 3,11,20 - triketo - 17α - hydroxypregnane - 21 - aldehyde was diluted with 50 ml. of water and concentrated under reduced pressure to about 20 ml. The product crystallized from solution as the monohydrate and was recovered by filtration and washed with water.

Various changes and modifications in the procedures herein disclosed will occur to those skilled in the art, and to the extent that such changes and modifications are embraced by the appended claims, it is to be understood that they constitute part of my invention.

What is claimed is:

1. The method of producing a Δ⁴-pregnene-21-aldehyde having the formula

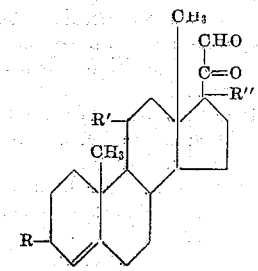

wherein R and R' represent substituents from the group consisting of hydrogen, hydroxy, keto, lower alkoxy, and lower acyloxy radicals, and R'' represents a substituent from the group consisting of hydrogen, hydroxy and lower acyloxy radicals, which comprises reacting the corresponding Δ⁴ - 20 - keto - 21 - hydroxypregnene with cupric acetate.

2. The method of producing Δ⁴ - 3,11,20 - triketo-17α - hydroxypregnene - 21 - aldehyde which comprises reacting Δ⁴ - 3,11,20 - triketo - 17α,21 - dihydroxypregnene with cupric acetate.

3. The method of producing Δ⁴ - 3,20 - diketo - 11β,-17α - dihydroxypregnene - 21 - aldehyde which comprises reacting Δ⁴ - 3,20 - diketo - 11β,17α,21 - trihydroxypregnene with cupric acetate.

4. A process which comprises reacting a 11,21-dihydroxy - 20 - keto - pregnane with cupric acetate to produce the corresponding 11 - hydroxy - 17 - glyoxylpregnane.

5. A process which comprises reacting a Δ⁴ - 20 - keto-11,21 - dihydroxypregnene with cupric acetate to produce the corresponding Δ⁴ - 20 - keto - 11 - hydroxypregnene - 21 - aldehyde.

6. A process which comprises reacting a compound selected from the group consisting of 20 - keto - 21-hydroxypregnenes, 20 - keto - 21 - hydroxy - allopregnanes and 20 - keto - 21 - hydroxypregnanes with cupric acetate to produce the corresponding 20 - keto - 21 - aldehyde compound.

References Cited in the file of this patent

UNITED STATES PATENTS

| 2,265,488 | Miescher | Dec. 9, 1941 |
| 2,275,790 | Miescher | Mar. 10, 1942 |
| 2,322,809 | Logemann | June 29, 1943 |
| 2,684,376 | Oliveto | July 20, 1954 |

OTHER REFERENCES

Rogers: Jour. Am. Chem. Soc. 74, page 2947, June 5, 1952 (received date May 19, 1952).